United States Patent
Gopalakrishnan et al.

(10) Patent No.: US 10,558,576 B2
(45) Date of Patent: Feb. 11, 2020

(54) STORAGE DEVICE WITH RAPID OVERLAY ACCESS

(71) Applicant: WESTERN DIGITAL TECHNOLOGIES, INC., San Jose, CA (US)

(72) Inventors: Raghavendra Das Gopalakrishnan, Bangalore (IN); Pankaj Dixit, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 110 days.

(21) Appl. No.: 15/876,785

(22) Filed: Jan. 22, 2018

(65) Prior Publication Data

US 2019/0227938 A1 Jul. 25, 2019

(51) Int. Cl.
*G06F 12/08* (2016.01)
*G06F 12/0862* (2016.01)
*G06F 12/0884* (2016.01)
*G06F 12/0853* (2016.01)

(52) U.S. Cl.
CPC ...... *G06F 12/0862* (2013.01); *G06F 12/0853* (2013.01); *G06F 12/0884* (2013.01); *G06F 2212/1024* (2013.01)

(58) Field of Classification Search
CPC ..... G06F 2212/1016; G06F 2212/1024; G06F 3/0601; G06F 3/0602; G06F 9/445; G06F 9/44557; G06F 9/44521
See application file for complete search history.

(56) References Cited

U.S. PATENT DOCUMENTS

| | | | | |
|---|---|---|---|---|
| 5,189,733 A * | 2/1993 | Bennett | ................. | G06F 9/4484 711/170 |
| 6,631,520 B1 * | 10/2003 | Theron | ..................... | G06F 8/65 712/E9.007 |
| 7,062,761 B2 * | 6/2006 | Slavin | ....................... | G06F 8/31 717/151 |
| 8,738,841 B2 * | 5/2014 | Olbrich | .............. | G06F 13/1657 711/103 |
| 10,083,135 B2 * | 9/2018 | Liu | ......................... | G06F 13/28 |
| 2004/0107328 A1 * | 6/2004 | Schultz | ................... | G06F 9/445 711/170 |
| 2006/0190924 A1 * | 8/2006 | Bruening | ............ | G06F 12/0875 717/104 |

(Continued)

OTHER PUBLICATIONS

JuHyung Hong, Sang Woo Han and Eui-Young Chung, A RAM cache approach using Host Memory Buffer of the NVMe interface, Department of Electrical and Electronic Engineering, Yonsei University, 2016 (Year: 2016).*

(Continued)

*Primary Examiner* — Khoa D Doan
(74) *Attorney, Agent, or Firm* — Vierra Magen Marcus LLP

(57) ABSTRACT

An example of a system includes a host interface, a set of non-volatile memory cells, and one or more control circuits coupled to the host interface and coupled to the set of non-volatile memory cells. The one or more control circuits include a portion of a Random Access Memory (RAM) configured as an overlay RAM. The one or more control circuits are configured to transfer overlay code to the overlay RAM via the host interface.

20 Claims, 9 Drawing Sheets

(56) References Cited

U.S. PATENT DOCUMENTS

| | | | |
|---|---|---|---|
| 2007/0006172 A1* | 1/2007 | Swoboda | G06F 9/445 717/131 |
| 2008/0010418 A1* | 1/2008 | Kao | G06F 13/1673 711/154 |
| 2008/0010420 A1* | 1/2008 | Kao | G06F 12/0223 711/154 |
| 2009/0210615 A1* | 8/2009 | Struk | G06F 12/123 711/104 |
| 2010/0023673 A1* | 1/2010 | Struk | G06F 12/08 711/103 |
| 2011/0283051 A1* | 11/2011 | Lieber | G06F 11/1417 711/103 |
| 2013/0173744 A1* | 7/2013 | Xinglong | G06F 3/0617 709/217 |
| 2017/0003981 A1* | 1/2017 | Erez | G06F 9/4418 |
| 2017/0102879 A1* | 4/2017 | Benisty | G06F 3/0604 |
| 2017/0242606 A1* | 8/2017 | Vlaiko | G06F 3/0625 |
| 2017/0351452 A1* | 12/2017 | Boyd | G06F 3/0611 |
| 2018/0024919 A1* | 1/2018 | Geml | G06F 3/061 711/103 |
| 2018/0165219 A1* | 6/2018 | Yang | G06F 3/0619 |
| 2019/0146709 A1* | 5/2019 | Im | G06F 3/0656 711/103 |

OTHER PUBLICATIONS

Jeroen Dorgelo, Mike Chaowei Chen, Host Memory Buffer (HMB) based SSD System, IEE, 2015, (Year: 2015).*

Mrinal J. Sarmah, Bokka Abhiram Saikrishma, Anil Kumar A. V., Kamalesh Vikramasimhan, "Method for Booting an All Programmable System-on-Chip over PCI Express Link", 2017 IEEE International Conference on Computational Intelligence and Computing Research (ICCIC). (Year: 2017).*

NVM Express, Revision 1.3, May 1, 2017, 282 pages.

* cited by examiner

STORAGE DEVICE WITH RAPID OVERLAY ACCESS

BACKGROUND

Semiconductor memory is widely used in various electronic devices such as cellular telephones, digital cameras, personal digital assistants, medical electronics, mobile computing devices, and non-mobile computing devices. Semiconductor memory may comprise non-volatile memory or volatile memory. A non-volatile memory allows information to be stored and retained even when the non-volatile memory is not connected to a source of power (e.g., a battery). Examples of non-volatile memory include flash memory (e.g., NAND-type and NOR-type flash memory) and Electrically Erasable Programmable Read-Only Memory (EEPROM).

A data storage device that includes semiconductor memory may be in communication with a host system through an interface. In some cases, more than one data storage device may be in communication with a host system through one or more interfaces. Various standardized interfaces may be used for communication between components including data storage devices and a host system, including Peripheral Component Interface (PCI), PCI express (PCIe), Serial ATA (SATA), Serial Attached SCSI (SAS), Non-Volatile Memory Host Controller Interface Specification (NVMHCIS) or NVM Express (NVMe), and other interfaces.

A data storage device may include one or more control circuits that facilitate operation of semiconductor memory. For example, a data storage device may include a memory controller that executes code (e.g. firmware) to carry out operations directed to a non-volatile memory (e.g. access operations such as read and write operations). Such code may be loaded into a Random Access Memory (RAM) coupled to the memory controller for execution.

BRIEF DESCRIPTION OF THE DRAWINGS

Like-numbered elements refer to common components in the different figures.

DETAILED DESCRIPTION

In some examples of the present technology, a memory system may include a Random Access Memory (RAM) for executable code that is executed by control circuits (e.g. a RAM for memory controller firmware that is executed to perform memory controller functions including read and write operations). In some cases, the amount of executable code may exceed the capacity of the RAM so that the entire executable code cannot be loaded into RAM at the same time. Instead, portions of executable code may be loaded into RAM as needed. The executable code may be divided so that a portion of the executable code (e.g. code that is frequently used) remains in RAM while other portions of the executable code (e.g. code that is infrequently used) may be loaded as needed and evicted when not in use. The RAM may be partitioned accordingly into resident RAM, which contains executable code that remains in RAM, and overlay RAM, which contains portions of executable code (overlay code) that are loaded as needed (e.g. in response to overlay requests). Portions of overlay code may be evicted from overlay RAM to make way for other portions of overlay code. Executable code, including overlay code, may be stored in non-volatile memory so that overlay code may be copied from non-volatile memory in response to an overlay request. However, in some cases, accessing non-volatile memory may be slower than desirable and copying portions of overlay code from non-volatile memory may cause unwanted delay.

In some examples, a host may provide some resources to a memory system connected to the host. An example of such a resource is a Host Memory Buffer (HMB) that may be provided by a host to allow a memory system to use some host memory capacity. For example, some interface standards specify how resources, including memory resources such as HMBs, may be provided and accessed through an interface. An example is a HMB specified by the NVMe standard In an example of the present technology, overlay code may be stored in, and accessed from an HMB. Portions of overlay code are transferred from the HMB, through a host interface, to overlay RAM in a memory system (not directly from non-volatile memory). This may be significantly faster than accessing non-volatile memory (e.g. two orders of magnitude, or one hundred times faster). Overlay code may be copied from non-volatile memory to the HMB as part of an initialization procedure and may subsequently be accessed from the HMB (and not from the non-volatile memory).

Figure 1:
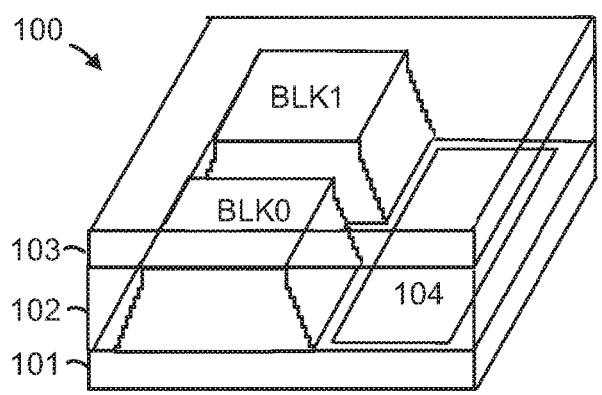
FIG. 1 is a perspective view of a 3D stacked non-volatile memory device.

FIGS. 1-4 describe one example of a memory system that can be used to implement the technology proposed herein. FIG. 1 is a perspective view of a three-dimensional (3D) stacked non-volatile memory device. The memory device 100 includes a substrate 101. On and above the substrate are example blocks of memory cells, including BLK0 and BLK1, formed of memory cells (non-volatile storage elements). Also, on substrate 101 is peripheral area 104 with support circuits for use by the blocks. Substrate 101 can also carry circuits under the blocks, along with one or more lower metal layers which are patterned in conductive paths to carry signals of the circuits. The blocks are formed in an intermediate region 102 of the memory device. In an upper region 103 of the memory device, one or more upper metal layers are patterned in conductive paths to carry signals of the circuits. Each block of memory cells comprises a stacked area of memory cells, where alternating levels of the stack represent word lines. While two blocks are depicted as an example, additional blocks can be used, extending in the x- and/or y-directions.

In one example implementation, the length of the plane in the x-direction, represents a direction in which signal paths for word lines extend (a word line or SGD line direction), and the width of the plane in the y-direction, represents a direction in which signal paths for bit lines extend (a bit line direction). The z-direction represents a height of the memory device.

Figure 2:
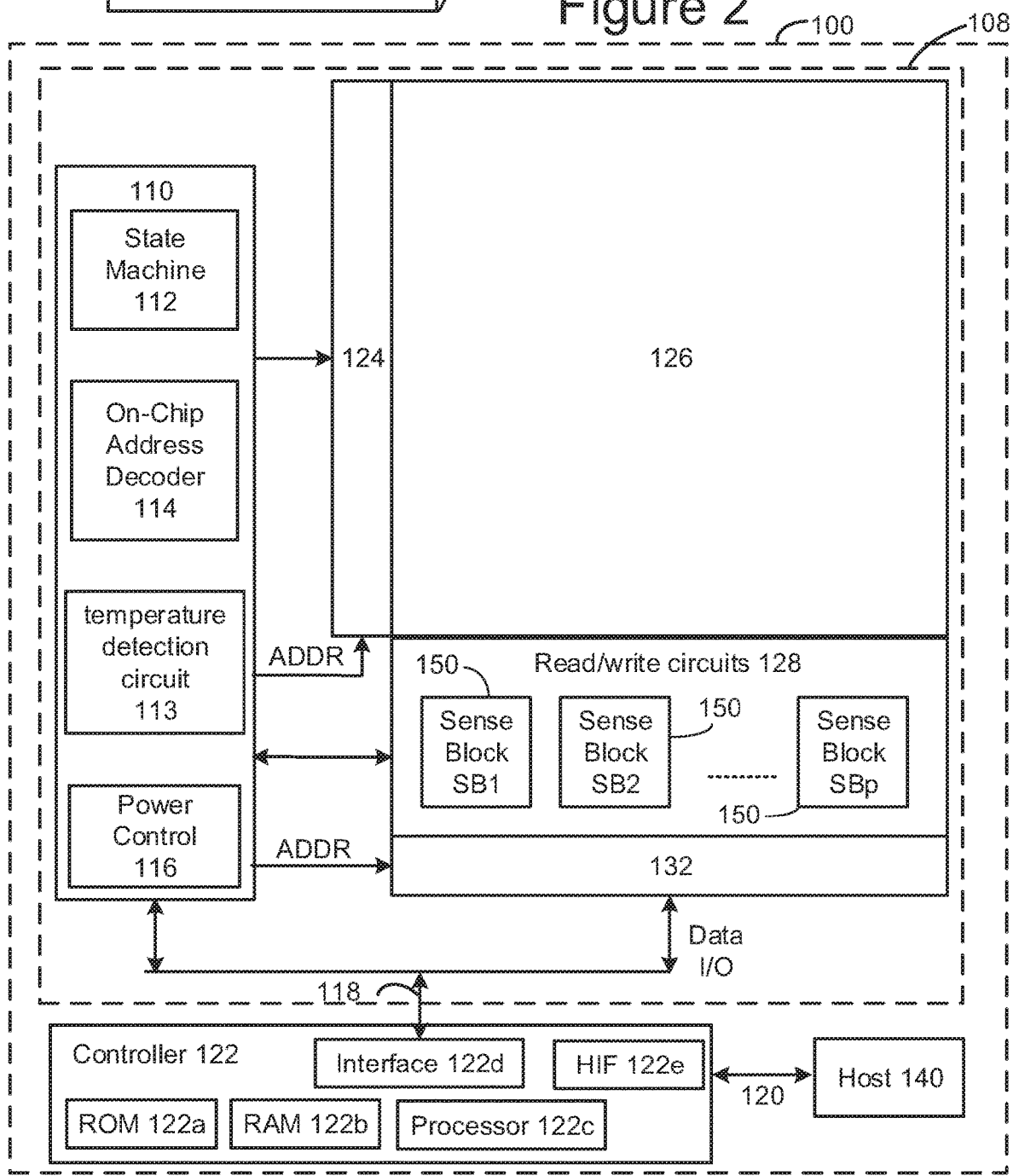
FIG. 2 is a functional block diagram of a memory device such as the 3D stacked non-volatile memory device 100 of FIG. 1.

FIG. 2 is a functional block diagram of an example memory device such as the 3D stacked non-volatile memory device 100 of FIG. 1. The components depicted in FIG. 2 are electrical circuits. Memory device 100 includes one or more memory die 108. Each memory die 108 includes a three-dimensional memory structure 126 of memory cells (such as, for example, a 3D array of memory cells), control circuitry 110, and read/write circuits 128. In other embodiments, a two-dimensional array of memory cells can be used. Memory structure 126 is addressable by word lines via a decoder 124 (row decoder) and by bit lines via a column decoder 132. The read/write circuits 128 include multiple sense blocks 150 including SB1, SB2, . . . , SBp (sensing circuitry) and allow a page of memory cells to be read or programmed in parallel. In some systems, a Controller 122 is included in the same memory device, such as memory device 100 (e.g., a removable storage card) as the one or more memory die 108. However, in other systems, the Controller can be separated from the memory die 108. In some embodiments, the Controller will be on a different die than the memory die. In some embodiments, one Controller 122 will communicate with multiple memory die 108. In other embodiments, each memory die 108 has its own Controller. Commands and data are transferred between the host 140 and Controller 122 via a data bus 120, and between Controller 122 and the one or more memory die 108 via lines 118. In one embodiment, memory die 108 includes a set of input and/or output (I/O) pins that connect to lines 118.

Memory structure 126 may comprise one or more arrays of memory cells including a 3D array. The memory structure may comprise a monolithic three-dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Control circuitry 110 cooperates with the read/write circuits 128 to perform memory operations (e.g., erase, program, read, and others) on memory structure 126, and includes a state machine 112, an on-chip address decoder 114, and a power control module 116. The state machine 112 provides chip-level control of memory operations. Temperature detection circuit 113 is configured to detect temperature, and can be any suitable temperature detection circuit known in the art. In one embodiment, state machine 112 is programmable by the software. In other embodiments, state machine 112 does not use software and is completely implemented in hardware (e.g., electrical circuits). In one embodiment, control circuitry 110 includes registers, ROM fuses and other storage devices for storing default values such as base voltages and other parameters.

The on-chip address decoder 114 provides an address interface between addresses used by host 140 or Controller 122 to the hardware address used by the decoders 124 and 132. Power control module 116 controls the power and voltages supplied to the word lines and bit lines during memory operations. It can include drivers for word line layers (discussed below) in a 3D configuration, select transistors (e.g., SGS and SGD transistors, described below) and source lines. Power control module 116 may include charge pumps for creating voltages. The sense blocks include bit line drivers. An SGS transistor is a select gate transistor at a source end of a NAND string, and an SGD transistor is a select gate transistor at a drain end of a NAND string.

Any one or any combination of control circuitry 110, state machine 112, decoders 114/124/132, temperature detection circuit 113, power control module 116, sense blocks 150, read/write circuits 128, and Controller 122 can be considered a circuit or circuits (or a managing circuit) that performs the functions described herein.

Controller 122 (which in one embodiment is an electrical circuit that may be on-chip or off-chip) may comprise one or more processors 122c, ROM 122a, RAM 122b, Memory interface 122d and Host Interface 122e, all of which are interconnected. One or more processors 122C is one example of a control circuit. Other embodiments can use state machines or other custom circuits designed to perform one or more functions. The storage devices (including ROM 122a, RAM 122b) comprises code such as a set of instructions, and the processor 122c is operable to execute the set of instructions to provide the functionality described herein. Alternatively, or additionally, processor 122c can access code from a storage device in the memory structure, such as a reserved area of memory cells connected to one or more word lines. Memory interface 122d, in communication with ROM 122a, RAM 122b and processor 122c, is an electrical circuit that provides an electrical interface between Controller 122 and memory die 108. For example, memory interface 122d can change the format or timing of signals, provide a buffer, isolate from surges, latch I/O, etc. Processor 122C can issue commands to control circuitry 110 (or any other component of memory die 108) via Memory interface 122d. Host Interface 122e in communication with ROM 122a, RAM 122b and processor 122c, is an electrical circuit that provides an electrical interface between Controller 122 and host 140. For example, Host Interface 122e can change the format or timing of signals, provide a buffer, isolate from surges, latch I/O, etc. Commands and data from host 140 are received by Controller 122 via Host Interface 122e. Data sent to host 140 are transmitted via Host Interface 122e.

Multiple memory elements in memory structure 126 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors.

A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

A three-dimensional memory array is arranged so that memory cells occupy multiple planes or multiple memory device levels, thereby forming a structure in three dimensions (i.e., in the x, y and z directions, where the z direction is substantially perpendicular, and the x and y directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in they direction) with each column having multiple memory cells. The vertical columns may be arranged in a two-dimensional configuration, e.g., in an x-y plane, resulting in a three-dimensional arrangement of memory cells, with memory cells on multiple vertically stacked memory planes. Other configurations of memory elements in three dimensions can also constitute a three-dimensional memory array.

By way of non-limiting example, in a three-dimensional NAND memory array, the memory elements may be coupled together to form vertical NAND strings that traverse across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

A person of ordinary skill in the art will recognize that the technology described herein is not limited to a single specific memory structure, but covers many relevant memory structures within the spirit and scope of the technology as described herein and as understood by one of ordinary skill in the art.

Figure 3:
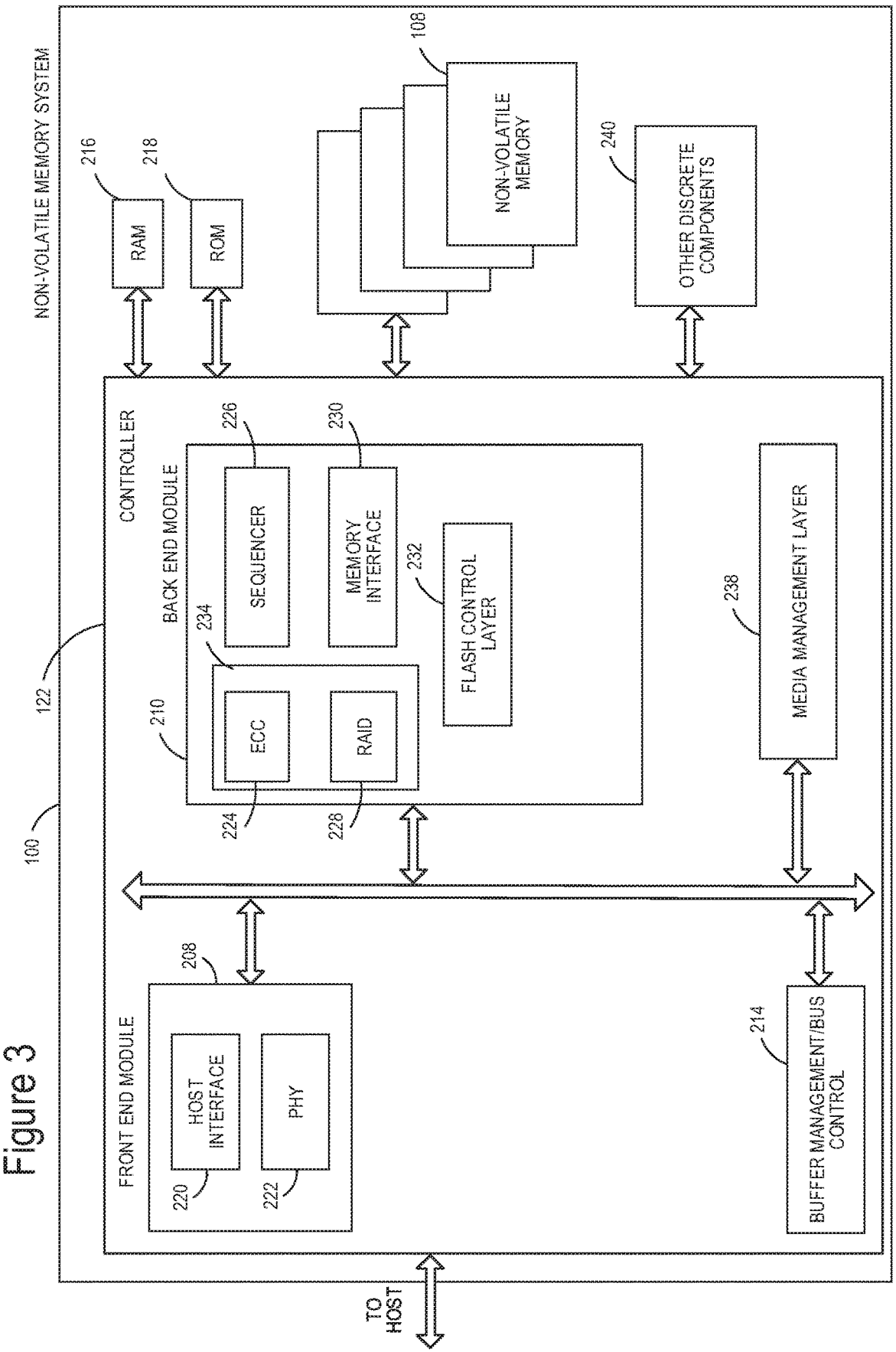
FIG. 3 is a block diagram depicting one embodiment of a Controller.

FIG. 3 is a block diagram of memory system 100, depicting more details of Controller 122. In one embodiment, the system of FIG. 3 is a solid-state drive (SSD). As used herein, a flash memory Controller is a device that manages data stored on flash memory and communicates with a host, such as a computer or electronic device. A flash memory Controller can have various functionality in addition to the specific functionality described herein. For example, the flash memory Controller can format the flash memory to ensure the memory is operating properly, map out bad flash memory cells, and allocate spare memory cells to be substituted for future failed memory cells. Some part of the spare memory cells can be used to hold firmware to operate the flash memory Controller and implement other features. In operation, when a host needs to read data from or write data to the flash memory, it will communicate with the flash memory Controller. If the host provides a logical address to which data is to be read/written, the flash memory Controller can convert the logical address received from the host to a physical address in the flash memory. (Alternatively, the host can provide the physical address). The flash memory Controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The communication interface between Controller 122 and non-volatile memory die 108 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system. For example, the flash memory may be embedded within the host, such as in the form of a solid-state disk (SSD) drive installed in a personal computer.

In some embodiments, memory system 100 includes a single channel between Controller 122 and non-volatile memory die 108, the subject matter described herein is not limited to having a single memory channel. For example, in some memory system architectures, 2, 4, 8 or more channels may exist between the Controller and the memory die, depending on Controller capabilities. In any of the embodiments described herein, more than a single channel may exist between the Controller and the memory die, even if a single channel is shown in the drawings.

As depicted in FIG. 3, Controller 122 includes a front-end module 208 that interfaces with a host, a back-end module 210 that interfaces with the one or more non-volatile memory die 108, and various other modules that perform functions which will now be described in detail.

The components of Controller 122 depicted in FIG. 3 may take the form of a packaged functional hardware unit (e.g., an electrical circuit) designed for use with other components, a portion of a program code (e.g., software or firmware) executable by a (micro)processor or processing circuitry (or one or more processors) that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively, or in addition, each module may include or comprise software stored in a processor readable device (e.g., memory) to program one or more processors for Controller 122 to perform the functions described herein. The architecture depicted in FIG. 3 is one example implementation that may (or may not) use the components of Controller 122 depicted in FIG. 2 (i.e. RAM, ROM, processor, interface).

Referring again to modules of the Controller 122, a buffer manager/bus Controller 214 manages buffers in random access memory (RAM) 216 and controls the internal bus arbitration of Controller 122. A read only memory (ROM) 218 stores system boot code. Although illustrated in FIG. 3 as located separately from the Controller 122, in other embodiments one or both of the RAM 216 and ROM 218 may be located within the Controller. In yet other embodiments, portions of RAM and ROM may be located both within the Controller 122 and outside the Controller. Further, in some implementations, the Controller 122, RAM 216, and ROM 218 may be located on separate semiconductor die.

Front-end module 208 includes a host interface 220 and a physical layer interface 222 (PHY) that provide the electrical interface with the host or next level storage Controller. The choice of the type of host interface 220 can depend on the type of memory being used. Examples of host interfaces 220 include, but are not limited to, SATA, SATA Express, SAS, Fibre Channel, USB, PCIe, and NVMe. The host interface 220 may be a communication interface that facilitates transfer for data, control signals, and timing signals.

Back-end module 210 includes an error correction Controller (ECC) engine, ECC engine 224, that encodes the data bytes received from the host, and decodes and error corrects the data bytes read from the non-volatile memory. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the memory system 100. In some cases, the RAID module 228 may be a part of the ECC engine 224. Note that the RAID parity may be added as an extra die or dies as implied by the common name, but it may also be added within the existing die, e.g. as an extra plane, or extra block, or extra WLs within a block. ECC engine 224 and RAID module 228 both calculate redundant data that can be used to recover when errors occur and may be considered examples of redundancy encoders. Together, ECC engine 224 and RAID module 228 may be considered to form a combined redundancy encoder 234. A memory interface 230 provides the command sequences to non-volatile memory die 108 and receives status information from non-volatile memory die 108. In one embodiment, memory interface 230 may be a double data rate (DDR) interface, such as a Toggle Mode 200, 400, or 800 interface. A flash control layer 232 controls the overall operation of back-end module 210.

Additional components of memory system 100 illustrated in FIG. 3 include media management layer 238, which performs wear leveling of memory cells of non-volatile memory die 108. Memory system 100 also includes other discrete components 240, such as external electrical interfaces, external RAM, resistors, capacitors, or other components that may interface with Controller 122. In alternative embodiments, one or more of the physical layer interface 222, RAID module 228, media management layer 238 and buffer management/bus Controller 214 are optional components that are not necessary in the Controller 122.

The Flash Translation Layer (FTL) or Media Management Layer (MML) 238 may be integrated as part of the flash management that may handle flash errors and interfacing with the host. In particular, MML may be a module in flash management and may be responsible for the internals of NAND management. In particular, the MML 238 may include an algorithm in the memory device firmware which translates writes from the host into writes to the flash memory structure 126 of memory die 108. The MML 238 may be needed because: 1) the flash memory may have limited endurance; 2) the flash memory structure 126 may only be written in multiples of pages; and/or 3) the flash memory structure 126 may not be written unless it is erased as a block (i.e. a block may be considered to be a minimum unit of erase and such a non-volatile memory may be considered a block-erasable non-volatile memory). The MML 238 understands these potential limitations of the flash memory structure 126 which may not be visible to the host. Accordingly, the MML 238 attempts to translate the writes from host into writes into the flash memory structure 126.

Controller 122 may interface with one or more memory die 108. In one embodiment, Controller 122 and multiple memory dies (together comprising memory system 100) implement a solid-state drive (SSD), which can emulate, replace or be used instead of a hard disk drive inside a host, as a NAS device, etc. Additionally, the SSD need not be made to work as a hard drive.

Figure 4:
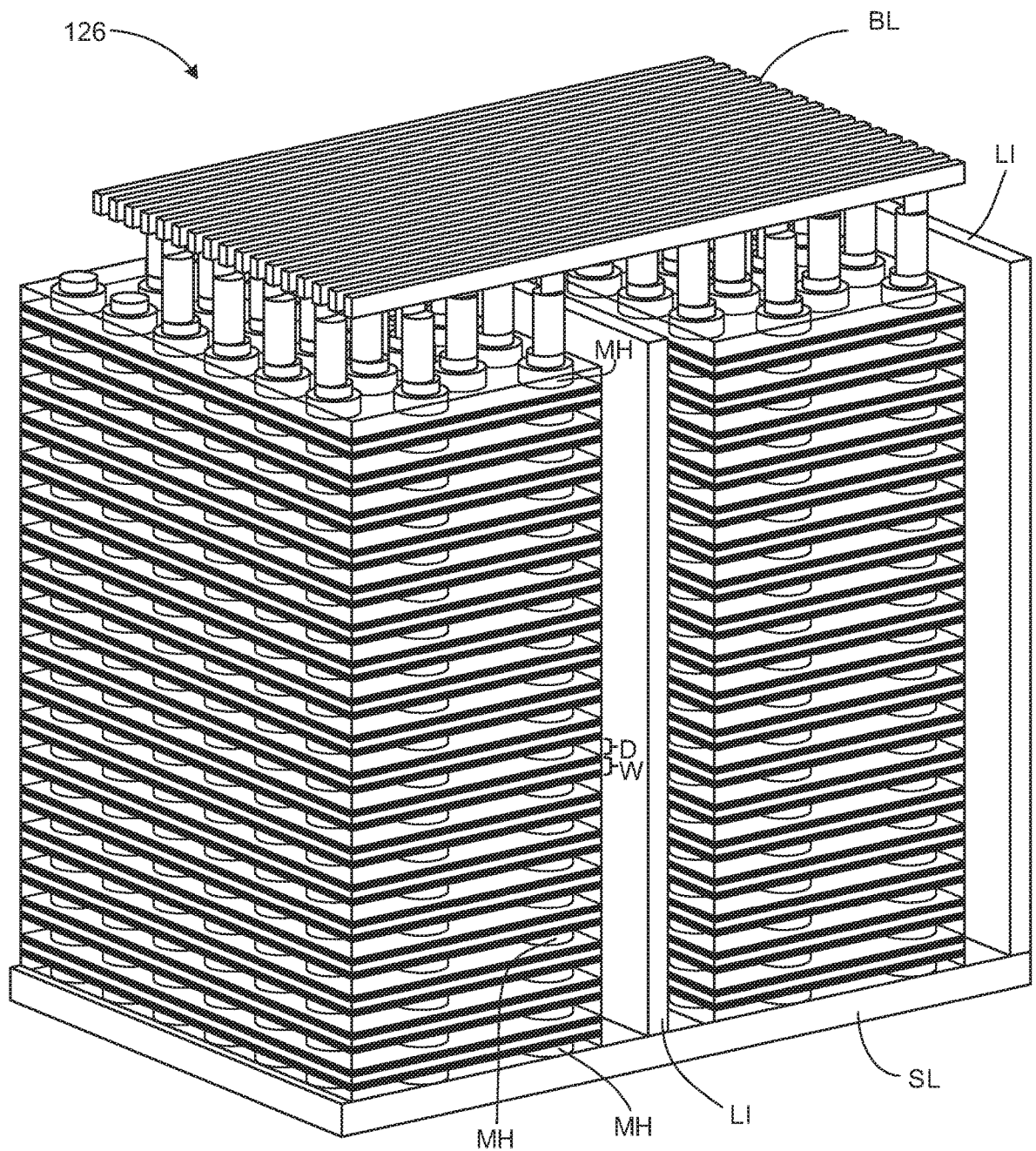
FIG. 4 is a perspective view of a portion of one embodiment of a three-dimensional monolithic memory structure.

FIG. 4 is a perspective view of a portion of a three-dimensional memory structure 126, which includes a plurality memory cells. For example, FIG. 4 shows a portion of one block of memory. The structure depicted includes a set of bit lines BL positioned above a stack of alternating dielectric layers and conductive layers. For example, for illustration purposes, one of the dielectric layers is marked as D and one of the conductive layers (also called word line layers) is marked as W. The number of alternating dielectric layers and conductive layers can vary based on specific implementation requirements. One set of embodiments includes between 108-216 alternating dielectric layers and conductive layers, for example, 96 data word line layers, 8 select layers, 4 dummy word line layers and 108 dielectric layers. More or less than 108-216 layers can also be used. As will be explained below, the alternating dielectric layers and conductive layers are divided into four "fingers" by local interconnects LI. FIG. 4 only shows two fingers and two local interconnects LI. Below and the alternating dielectric layers and word line layers is a source line layer SL. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping layer to create a vertical column of memory cells. Each memory cell can store one or more bits of data.

One example of a ReRAM memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. This configuration is known as a spin valve and is the simplest structure for an MRAM bit. A memory device is built from a grid of such memory cells. In one embodiment for programming a non-volatile storage system, each memory cell lies between a pair of write lines arranged at right angles to each other, parallel to the memory cell, one above and one below the memory cell. When current is passed through them, an induced magnetic field is created.

Phase change memory (PCRAM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse but includes a (continuous or non-continuous) vibration or burst of sound, current, voltage light, or other wave.

Figure 5:
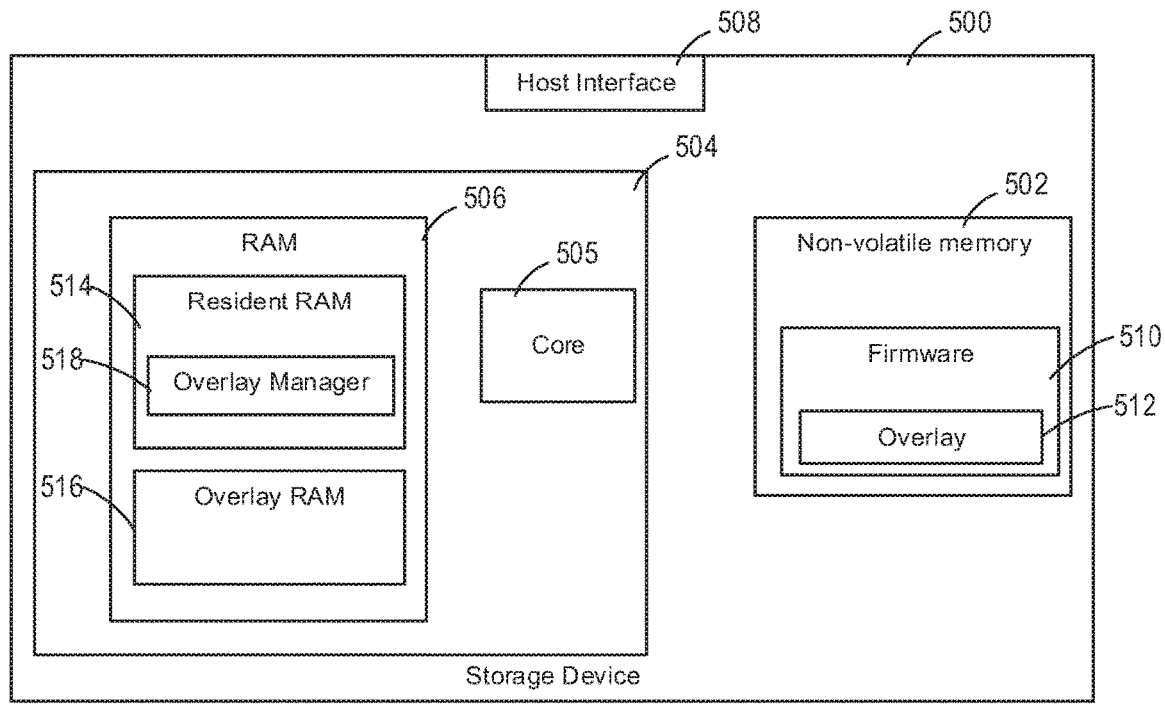
FIG. 5 illustrates an example of a storage device with overlay RAM.

In some cases, a non-volatile memory device such as non-volatile memory device 100 may use overlay code to provide efficient use of a memory controller RAM, e.g. by allowing RAM capacity to be smaller than the total amount of runtime memory controller firmware uses. An example of certain components of a storage device 500 that uses overlay code is illustrated in FIG. 5.

Storage device 500 includes a non-volatile memory 502 (e.g. one or more non-volatile memory dies 108) and a controller 504 (e.g. controller 122 of FIG. 3). Storage device 500 also includes RAM 506 (e.g. RAM 216), which is shown as internal to controller 504 and is used by core 505 of controller 504 for execution of executable code (e.g. firmware) at runtime. It will be understood that RAM 506 may be formed as part of controller 504 as illustrated, or separately (e.g. on the same die or on another die). A host interface 508 allows storage device 500 to communicate with a host and may be configured according to an interface standard. Additional components are omitted for clarity.

Non-volatile memory 502 includes a copy of firmware 510. Firmware 510 is executable code that, when executed by core 505 of controller 504 at runtime, causes controller 504 to carry out specified functions, e.g. writing data to non-volatile memory 502, reading data from nonvolatile memory 502 and transferring the data through host interface 508, and other such memory controller functions. Firmware 510 includes overlay portion 512. That is, firmware 510 includes some portions of data configured as overlay code that can be selectively loaded into RAM as needed. Portions of overlay code may be configured according to functions to be performed so that a particular portion of overlay code relating to a function is loaded into RAM to perform that function. In general, executable code associated with less frequently used functions is configured as overlay code while executable code associated with more frequently used functions is not configured as overlay code (so that it remains in RAM and not evicted).

RAM 506 is partitioned and includes a portion configured as a resident RAM 514 and another portion configured as an overlay RAM 516. Resident RAM 514 is configured to store executable code that is executed by controller 504 such as code used for read and write operations accessing non-volatile memory 502. Executable code in resident RAM 514 is generally loaded during an initialization procedure (e.g. when storage device 500 powers up) and is then maintained in resident RAM 514 throughout the period of operation of storage device 500 (e.g. until storage device 500 powers down). RAM 506 is generally a volatile memory such as a Static RAM (SRAM) so that when power is removed from RAM 506, data stored in RAM 506 is lost and must be reloaded when power is restored. For example, executable code in resident RAM 514 may be loaded from non-volatile memory 502 during an initialization procedure. Firmware 510 in non-volatile memory 502 includes executable code that may be copied into resident RAM 514 during the initialization procedure.

Overlay RAM 516 is a portion of RAM 506 that is configured to store overlay code and to facilitate replacement of portions of overlay code as needed. Thus, while resident RAM 514 generally contains the same executable code throughout a period of operation (e.g. between a power up and power down), overlay RAM 516 contains different portions of overlay code at different times as different functions are performed by controller 504. Portions of overlay code may be loaded into overlay RAM 516 as needed, for example, from non-volatile memory 502, which contains firmware 510, including overlay portion 512. RAM 506 may be formed as a single physical unit or may be made up of more than one physical unit that are operated together as a RAM. In some cases, resident RAM and overlay RAM may be in separate physical units.

An overlay manager handles copying of portions of executable code into overlay RAM 516 as needed. An overlay manager may be implemented by executable code that is executed by controller 504. For example, FIG. 5 shows overlay manager code 518 in resident RAM 514 and this code, when executed by controller 504, copies portions of overlay code from overlay portion 512 of non-volatile memory 502 to overlay RAM 516. This may cause eviction of a previously copied portion of overlay code when the overlay RAM 516 is already filled up (i.e. copying new overlay code may displace other overlay code from overlay RAM 516). It will be understood that functions performed by overlay code are generally delayed by the time needed to copy the corresponding portions of overlay code into overlay RAM 516 (assuming the corresponding portion is not already in overlay RAM 516), whereas executable code in resident RAM can be executed without such delay. Thus, time needed to read overlay code from non-volatile memory 502 may affect the total time needed to perform functions that are implemented using overlay code. For some non-volatile memories, this time may be significant.

Figure 6:
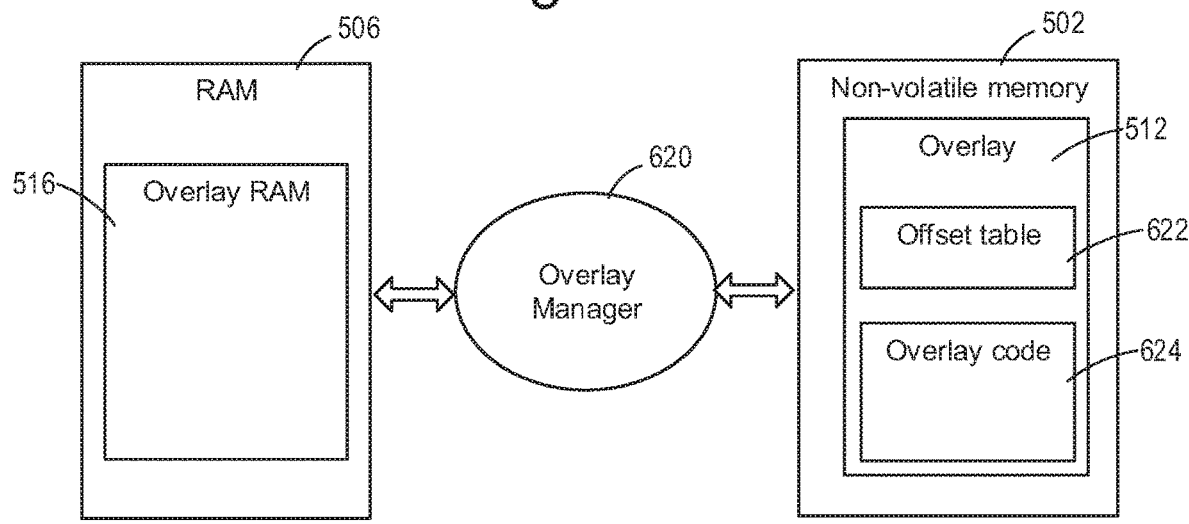
FIG. 6 illustrates an example of operation of an overlay manager.

FIG. 6 illustrates an example configuration of an overlay manager 620, for an overlay manager implemented by controller 504 executing overlay manager code 518 of FIG. 5. Overlay manager 620 manages overlay RAM 516 in RAM 506. Overlay manager 620 receives calls relating to functions that require execution of overlay code, e.g. other executable code that is executed by controller 504 may call for a function that is implemented by a portion of overlay code. All such calls including the load and eviction of related portions of overlay code may be managed by overlay manager 620. A linker may create unique sections or groups (e.g. portions of overlay code) in firmware. These portions of overlay code are stored in overlay code section 624 of overlay portion 512 stored in non-volatile memory 502). Each such portion of executable code (each section or group) has a binary code for the function or set of functions corresponding to the portion of executable code. Functions which are marked as overlay functions are linked to overlay manager 620 so that a call for an overlay function results in a call to overlay manager 620. Overlay manager 620 has a translation logic that maps an overlay function of an overlay call with the corresponding portion or portions of overlay code. For example, as illustrated in FIG. 6, overlay portion 512 in non-volatile memory 502 includes an offset table 622 (which may be referred to as a ".offsetTable section") that contains the offset of each portion of overlay code within overlay code section 624.

Figure 7:
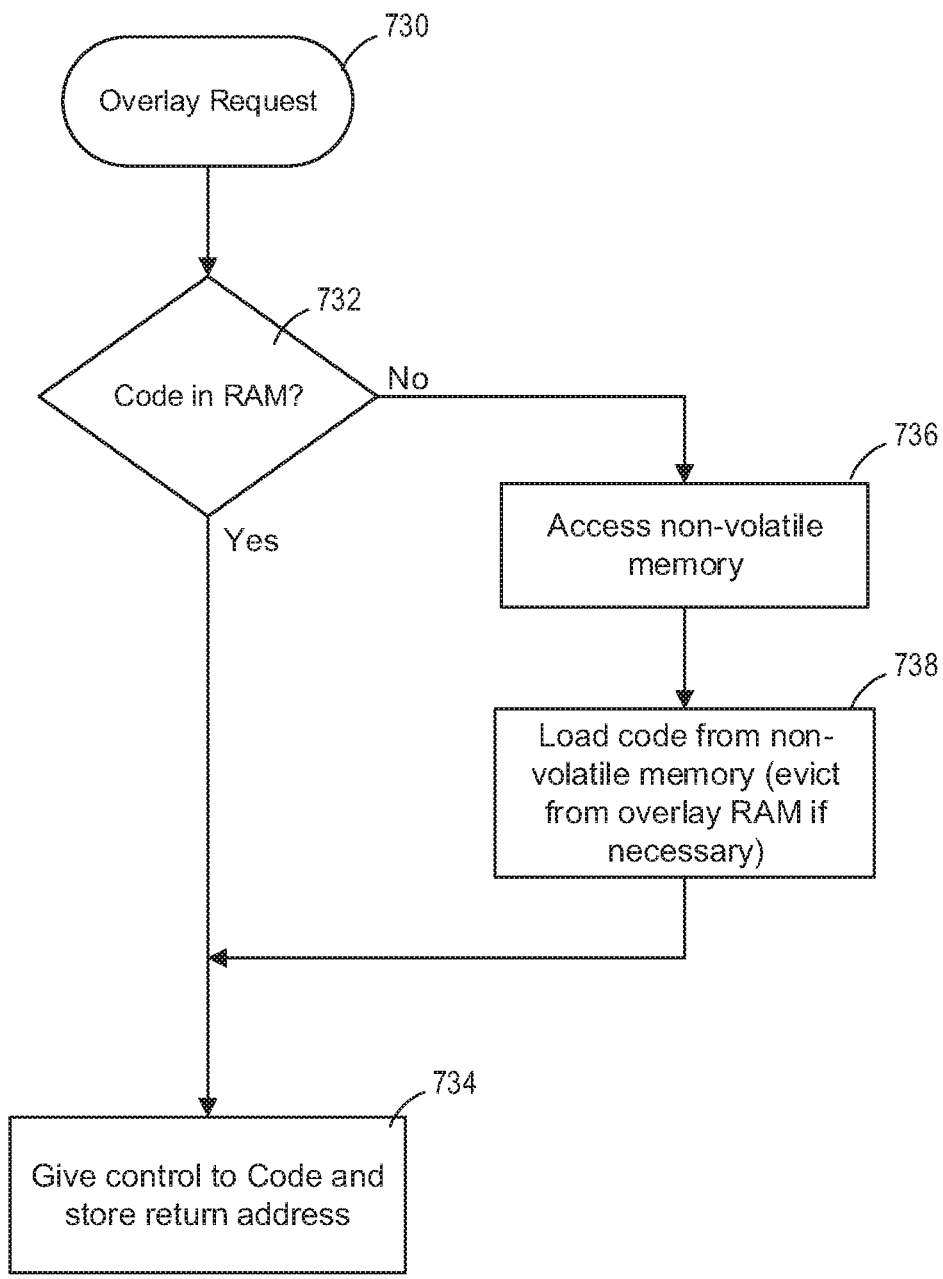
FIG. 7 illustrates an example of handling of an overlay request.

FIG. 7 illustrates an example operation of overlay manager 620 of FIG. 6, e.g. implemented by firmware in controller 504 of FIG. 5. When an overlay request is received 730 (e.g. by overlay manager 620), the overlay manger makes a determination 732 as to whether a corresponding portion of overlay code is already in Overlay RAM (e.g. in overlay RAM 516). For example, an overlay manager may use translation logic to identify a portion of overlay code associated with the function that is being called and may determine whether the identified portion of overlay code is currently in overlay RAM. If the portion of overlay code is in RAM, then the overlay manager gives control to the portion of code and stores the return address 734 which will give control to the next instruction from where the overlay function was called. This allows execution of the portion of overlay code from overlay RAM without change to contents of the overlay RAM. If the portion of code associated with the overlay request is determined to not be in Overlay RAM (determination 732), then the overlay manager accesses non-volatile memory 736 and loads code from nonvolatile memory 738, which may include evicting some other overlay code from overlay RAM if this is necessary to allow copying of the new portion of overlay code. Once the portion of overlay code is loaded into RAM, the overlay manager gives control to the portion of code and stores the return address 734. While execution of a portion of overlay code may be rapid if the portion of overlay code is already in Overlay RAM (similar to execution of code from resident RAM), accessing non-volatile memory and loading code from non-volatile memory may take significant time.

In some examples, where a memory system is connected to a host, the host may provide some resources to the memory system to facilitate or enhance operation of the memory system. For example, a host may configure one or more portions of host memory as a Host Memory Buffer (HMB) and may allow a memory system to use the HMB, e.g. host does not use portions of memory designated as a HMB and gives these portions to a memory system for its use. For example, some interface standards specify how certain resources, e.g. memory resources such as HMBs, may be provided and accessed through an interface. An example of such a standard is the NVM Express (NVMe) or Non-Volatile Memory Host Controller Interface Specification (NVMHCIS). NVMe is a protocol adapted for accessing data storage devices attached via a PCI or PCI Express (PCIe) bus and has some advantages over other protocols such as SCSI, SAS, or SATA, that were developed for Hard Disk Drives (HDDs). NVMe is generally defined by specifications generated by industry participants, for example, NVM_Express_Revision_1.3, published on May 1, 2017.

In examples of the present technology, one or more portions of overlay code may be stored in an HMB and may be accessed from the HMB. In some cases, such access may be faster than accessing non-volatile memory so that a portion of overlay code can be loaded and executed faster from HMB than from non-volatile memory.

Figure 8:
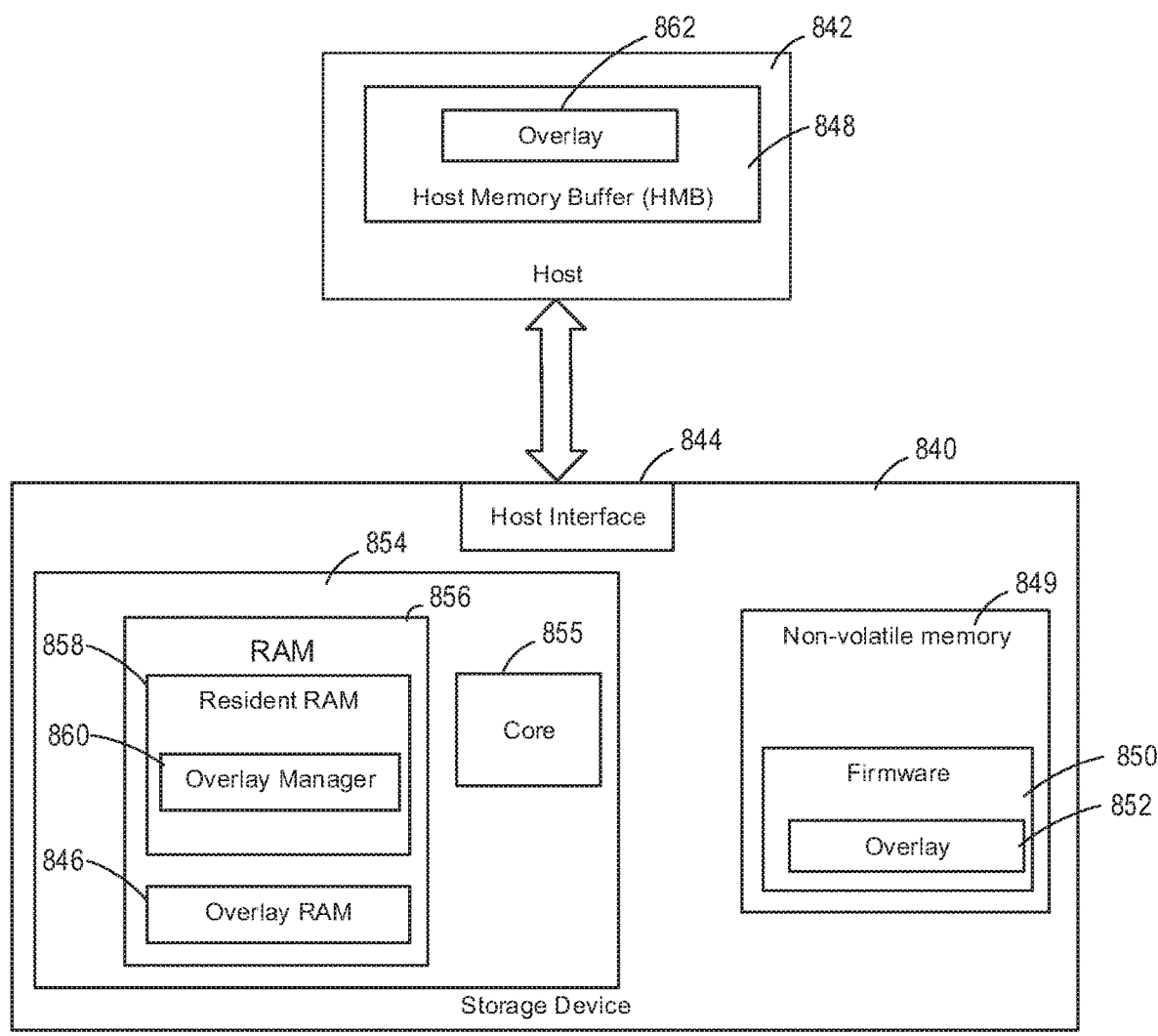
FIG. 8 illustrates an example of a storage device coupled to a host that has a Host Memory Buffer (HMB).

FIG. 8 shows an example of a storage device 840 that is in communication with a host 842 through host interface 844 and that is configured to transfer overlay code to overlay RAM 846 from a HMB 848 in host 842 (unlike, for example, storage device 500 of FIG. 5, which transferred overlay code from non-volatile memory). Storage device 840 includes non-volatile memory 849, which contains a copy of firmware 850, including an overlay portion 852. Overlay portion 852 may include overlay code, an offset table, and any other overlay-related code. Storage device 840 also includes controller 854, which is coupled to non-volatile memory 849 and which includes RAM 856 (i.e. RAM 856 is internal to controller 854 in this example). RAM 856 includes resident RAM 858 and overlay RAM 846. Resident RAM 858 contains executable code including overlay manager code 860, which, when executed by core 855 of controller 854 performs overlay manager functions including loading of portions of overlay code into overlay RAM 846 in response to overlay requests. However, unlike overlay manager 620, which transfers portions of overlay code from non-volatile memory into overlay RAM, here portions of overlay code are transferred from HMB 848, through host interface 844 to overlay RAM 846. Thus, some or all portions of overlay code may be stored in an overlay section 862 in HMB 848. For example, overlay section 862 may include an offset table and portions of overlay code (e.g. as shown in FIG. 6) and/or other overlay related code. Host interface 844 may be an NVMe interface configured for communication according to the NVMe standard (corresponding interface circuits in host 842, not shown in FIG. 8, may be similarly configured for NVMe communication). HMB 848 may be configured according to the NVMe standard, e.g. by an appropriate driver. Some example operations of a storage device using an HMB will now be described.

Figure 9:
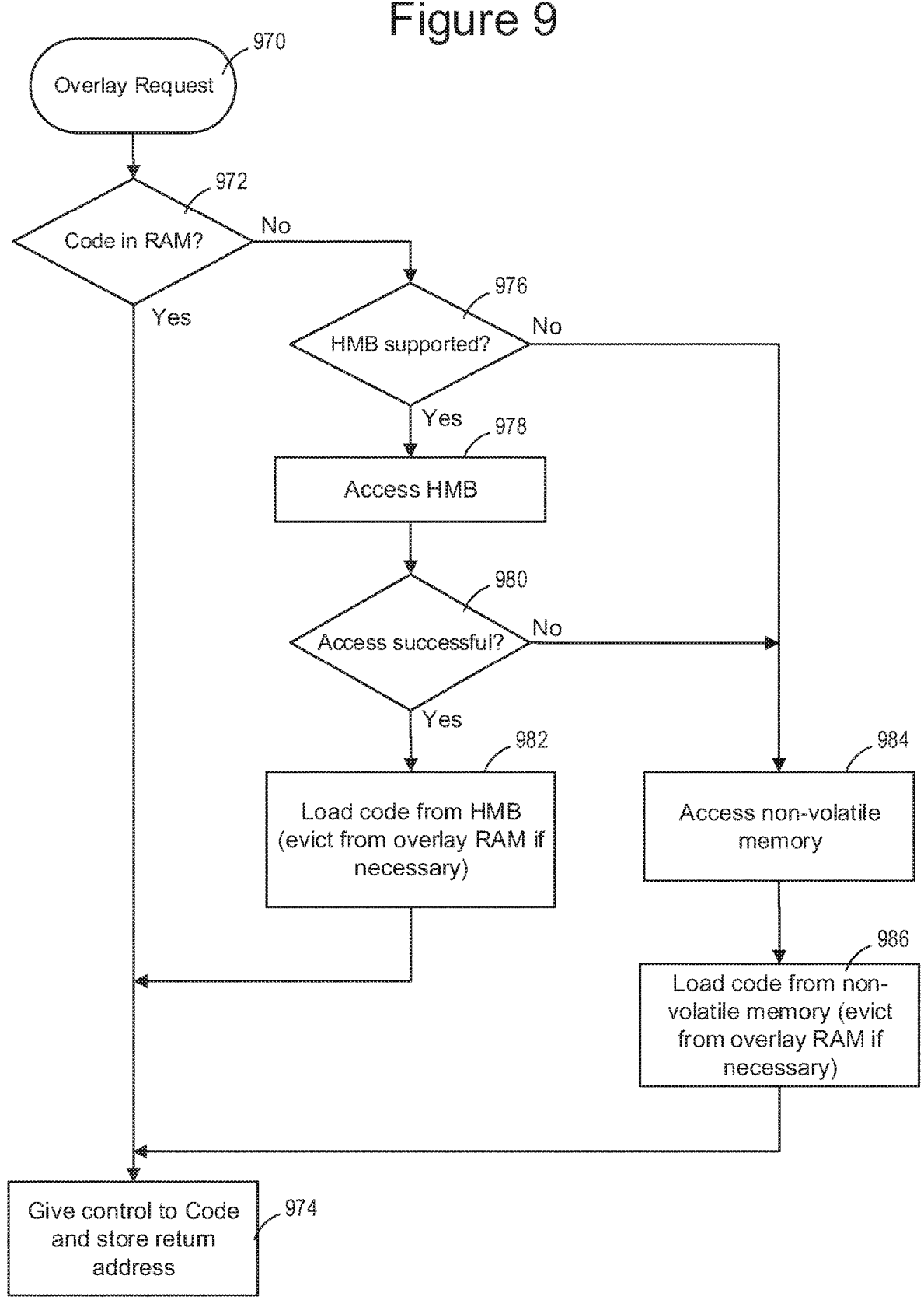
FIG. 9 illustrates an example of handling of an overlay request.

FIG. 9 shows an example of how a storage device, such as storage device 840 of FIG. 8, may respond to an overlay request 970, e.g. how an overlay manager in such a storage device may respond to such a request. A determination 972 is made as to whether a portion of overlay code associated with the overlay request is in overlay RAM. If the corresponding portion of overlay code is present in overlay RAM, then control is given to the portion of overlay code and a return address is stored 974 so that the portion of overlay code is executed from overlay RAM. If the outcome of determination 972 indicates that the corresponding portion of overlay code is not in RAM, then another determination 976 is made as to whether HMB is supported (e.g. the storage system is configured to determine if a host connected to its host interface has Host Memory Buffer (HMB) capacity for storage of overlay code). If HMB is supported, then the HMB is accessed 978. A further determination 980 is made as to whether the access to the HMB is successful. If it is successful, then the portion of overlay code is loaded from the HMB 982 and, if necessary, other overlay code is evicted from overlay RAM. Thus, the storage device transfers overlay code to the overlay RAM from the HMB through the host interface and not from non-volatile memory. Control is then given to the portion of overlay code and a return address is stored 974 so that the portion of overlay code is executed from overlay RAM. If either determination 976 indicates that HMB is not supported, or determination 980 indicates that access to the HMB is not successful, then non-volatile memory is accessed 984. For example, a portion of overlay code may be accessed in overlay portion 852 of non-volatile memory 849 instead of overlay section 862 of HMB 848. Code is loaded 986 from non-volatile memory and another portion of overlay RAM is evicted from overlay RAM if necessary. Control is then given to the portion of overlay code and a return address is stored 974 so that the portion of overlay code is executed from overlay RAM.

In order to access overlay code from an HMB, some copying of overlay code into HMB may be necessary. For example, some initialization procedure may place portions of overlay code in an HMB for subsequent access. In general, overlay code (along with other firmware) is stored in non-volatile memory so that configuring an HMB for use by an overlay manager may include copying overlay code from non-volatile memory to the HMB so that it is subsequently available from the HMB.

Figure 10:
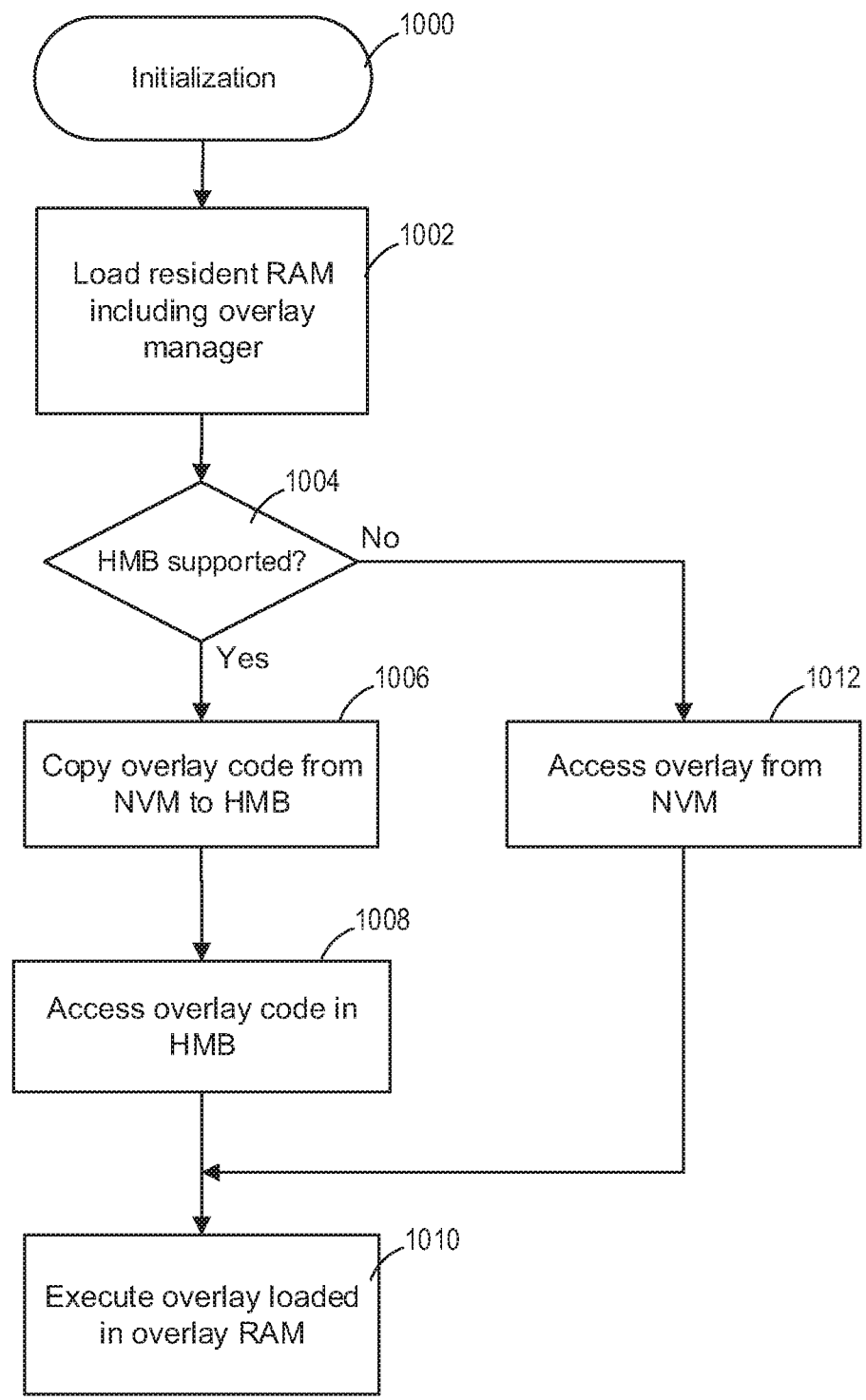
FIG. 10 illustrates an example of an initialization procedure.

FIG. 10 illustrates an example of an initialization procedure for a storage device connected to a host, for example, storage device 840 connected to host 842 as shown in FIG. 8. Initialization may be triggered by a power on 1000 or some other triggering event. Resident RAM is loaded 1002 with executable code that includes overlay manager code. Thus, at least some functions can be carried out by a controller using code in resident RAM, this includes overlay manager functions where overlay manager code is loaded in resident RAM. A determination 1004 is made as to whether HMB is supported by the host. For example, a handshaking routine may determine whether the host supports an HMB and, if so, may provide sufficient information for the storage device to access the HMB. If the host supports HMB then overlay code is copied 1006 from non-volatile memory (NVM) to the HMB. Subsequently, overlay code is accessed by accessing overlay code in the HMB 1008 (not overlay code in non-volatile memory unless the copy in HMB cannot be accessed for some reason). Thus, portions of overlay code are transferred from the HMB through the host interface to overlay RAM rather than from non-volatile memory to overlay RAM. Overlay code that is loaded in RAM is then executed 1010. If determination 1004 indicates that HMB is not supported, then overlay code is accessed from nonvolatile memory 1012. Thus, portions of overlay code are transferred from the non-volatile memory to overlay RAM in this case. Overlay code that is loaded in RAM is then executed 1010.

Figure 11:
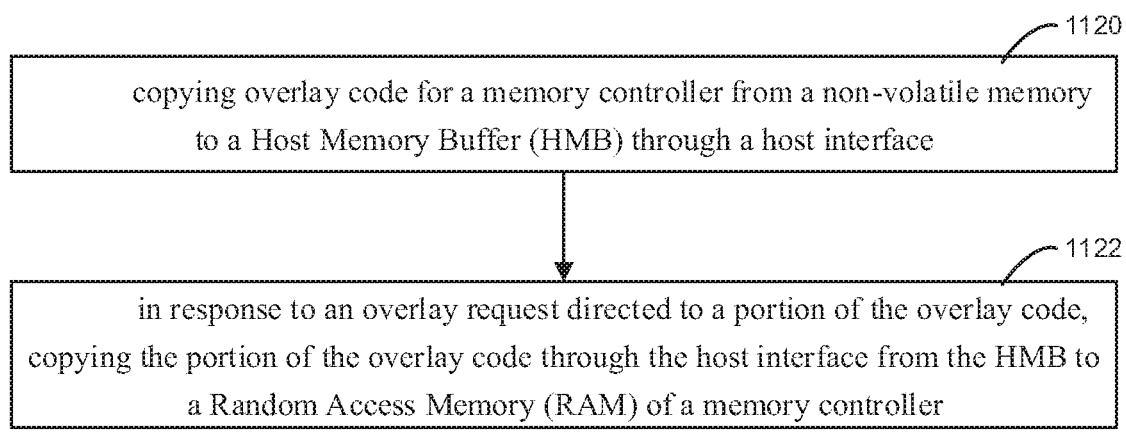
FIG. 11 illustrates an example of a process that includes copying overlay code to a HMB.

FIG. 11 illustrates an example of a method that uses aspects of the present technology and may be implemented, for example, using hardware as illustrated in FIG. 8. The method includes copying overlay code for a memory controller from a non-volatile memory to a Host Memory Buffer (HMB) through a host interface 1120, and in response to an overlay request directed to a portion of the overlay code, copying the portion of the overlay code through the host interface from the HMB to a Random Access Memory (RAM) of a memory controller 1122. Copying the overlay code from the non-volatile memory to the HMB may be performed during an initialization process (which may include a determination whether a host provides HMB functionality to support overlay code) and subsequent access to the overlay code may be directed to the HMB and not to the non-volatile memory. If a host does not provide HMB functionality to support overlay code, or if the overlay code in the HMB cannot be accessed, the overlay code in the non-volatile memory is accessed instead.

Examples of functions that may be implemented using portions of overlay code may include, for example, some functions relating to power states, security, host booting, administration, or other functions that may be performed infrequently (as compared, for example, with reading and writing).

For example, in some memory systems device power states (DPSs) may be used to manage power consumption (e.g. one or more low-power or "sleep mode" states may be used). Entering and exiting such conditions may be triggered by low-power or other triggering events. Corresponding code relating to entering and exiting such conditions may be configured as overlay code that may be loaded into overlay RAM in response to a triggering event and may be evicted after a transition to another power state is complete.

Some memory systems may secure data stored in non-volatile memory using control circuits (e.g. a memory controller) configured by firmware to limit access (e.g. Pyrite Security Subsystem Class (SSC) or Opal SSC). In some cases, such security is implemented by an initialization process (e.g. exchanging keys or performing some other one-time configuration steps) so that code for such an initialization process is infrequently used and may be suitable for configuration as overlay code.

Some memory systems may contain data that may be used by a host for booting. For example, host boot code may be stored in a non-volatile memory system connected to a host rather than in the host itself. Such boot code/data may be stored in a replay protected memory block (RPMB) or other secure structure. Accessing such boot code and accessing other RPMB code may require execution of a portion of firmware that may be configured as overlay code.

Some memory systems may use firmware executed by control circuits (e.g. memory controller) to perform certain administrative tasks. For example, in the NVMe protocol, namespace control (e.g. creation, configuration, modification, and deletion of a namespace), I/O queue control, set features, or other tasks may be performed by control circuits that are configured using executable code. This executable code may be configured as one or more portions of overlay code.

The total amount of time saved by accessing overlay code from HMB rather than from non-volatile memory depends on access latency and the number of access operations. The following table gives an example of different access latency for different memories including controller RAM (internal SRAM in this example, in other examples RAM may be external, and may not be SRAM), host memory bus, and non-volatile memory (NAND in this example):

| Memory Type | Access Latency |
| --- | --- |
| Internal SRAM | 200-300 ns |
| Host Memory Buffer | 2-5.9 μs |
| NAND | 50-200 μs |

It can be seen that access latency for code that is in internal SRAM (e.g. a portion of overlay code in resident RAM or already loaded in overlay RAM) is 200-300 ns, for code that is in HMB 2-5.9 μs, and for NAND 50-200 μs. Thus, accessing HMB rather than non-volatile memory may provide an improvement in access latency of two orders of magnitude (from 200 μs to 2 μs) and at least about an order of magnitude (from 50 μs to 5.9 μs) in this example (access latency may vary depending on a number of factors).

In some cases, reduced latency from HMB may allow use of a smaller resident RAM by configuring more firmware as overlay code. Overlay RAM may also be smaller because of the reduced latency associated with loading new portions of overlay code (i.e. reduced need to keep overlay code in overlay RAM). This may allow RAM to be used for other purposes or may allow smaller RAM to be used, thus saving cost.

Generally, the impact of thrashing is reduced because of reduced access latency (e.g. whenever a portion of overlay code is replaced the time delay is less when the replacement portion of overlay code is copied from HMB). Thus, for a given replacement rate, the cumulative delay caused by loading overlay RAM is reduced.

Sometimes overlay managers may lock a portion of overlay code in overlay RAM for a period of time (i.e. keep it in overlay RAM and prevent it from being evicted) to avoid delay associated with loading from non-volatile memory. However, locking certain portions of overlay code reduces the runtime overlay RAM capacity available for other portions of overlay code. With reduced access latency associated with HMB, the need to lock portions of overlay code may be reduced or eliminated.

In some cases, accessing portions of overlay code from HMB may allow portions of overlay code to be configured in larger units. For example, different functions that may be performed together may be grouped and the corresponding code may be loaded as a single portion of overlay code in response to a single overlay call.

An example of a system includes: a host interface; a set of non-volatile memory cells; and one or more control circuits coupled to the host interface and coupled to the set of non-volatile memory cells, the one or more control circuits including a portion of a Random Access Memory (RAM) configured as an overlay RAM, the one or more control circuits configured to transfer overlay code to the overlay RAM via the host interface.

The one or more control circuits may be configured to transfer overlay code to the overlay RAM from a Host Memory Buffer (HMB) in a host connected to the host interface. The set of non-volatile memory cells may contain a copy of the overlay code and the one or more control circuits may be configured to copy one or more portions of the overlay code from the set of non-volatile memory cells to the HMB in the host. The one or more control circuits may further include another portion of the RAM configured as a resident RAM, the resident RAM including code for operating an overlay manager. The RAM may be a Static Random Access Memory (SRAM). The host interface may be a Non-Volatile Memory express (NVMe) interface and the one or more control circuits may be configured to determine if a host connected to the host interface has Host Memory Buffer (HMB) capacity for storage of overlay code. The one or more control circuits may include an overlay manager configured to transfer overlay code to the overlay RAM from the HMB for any host that has HMB capacity for storage of overlay code and to transfer overlay code to the overlay RAM from non-volatile memory for any host that does not have HMB capacity for storage of overlay code. The overlay RAM may have a capacity to store a quantity of data equal to between 40% and 70% of the overlay code. The set of non-volatile memory cells may be formed in a plurality of memory levels disposed above a substrate in a monolithic three-dimensional memory structure.

An example of a method includes copying overlay code for a memory controller from a non-volatile memory to a Host Memory Buffer (HMB) through a host interface; and in response to an overlay request directed to a portion of the overlay code, copying the portion of the overlay code through the host interface from the HMB to a Random Access Memory (RAM) of a memory controller.

Copying the overlay code from the non-volatile memory to the HMB may be performed during an initialization process and subsequent access to the overlay code is directed to the HMB and not to the non-volatile memory. The initialization process may include a determination whether a host provides HMB functionality to support overlay code. The method may include, in response to a determination that a first host does not provide HMB functionality to support overlay code, accessing the overlay code in the non-volatile memory. The method may include, in response to a determination that a second host provides HMB functionality to support overlay code, attempting to access the overlay code in the HMB of the second host and, in response to failing to access the overlay code in the HMB of the second host, accessing the overlay code in the non-volatile memory. The method may include executing the portion of the overlay code from the RAM and subsequently evicting the portion of the overlay code from the RAM and copying another portion of the overlay code through the host interface from the HMB to the RAM. The method may further include maintaining an offset table in the HMB, the offset table providing location information regarding portions of overlay code stored in the HMB. The host interface may be configured according to the Non-Volatile Memory express (NVMe) standard and the HMB may be formed of one or more portions of Dynamic Random Access Memory (DRAM) in a host that are made available to the memory controller according to the NVMe standard. The time to transfer the portion of the overlay code from the HMB to the RAM may be in a range of about 10 to 100 times less than time to transfer a copy of the portion of the overlay code through a memory interface from the non-volatile memory to the RAM.

An example of an apparatus includes a host interface; a memory controller Random Access Memory (RAM); means for transferring portions of overlay code from a Host Memory Buffer (HMB) through the host interface to the memory controller RAM; and means for executing portions of overlay code from the memory controller RAM.

The apparatus may further include means for copying the overlay code from a non-volatile memory to the Host Memory Buffer (HMB).

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A system, comprising:
a host interface;
a set of non-volatile memory cells; and
one or more control circuits coupled to the host interface and coupled to the set of non-volatile memory cells, the one or more control circuits including a portion of a Random Access Memory (RAM) configured as an overlay RAM, the one or more control circuits configured to transfer overlay code from the set of non-volatile memory cells to a Host Memory Buffer (HMB) in a host through the host interface, copy one or more portions of the overlay code from the HMB to the overlay RAM via the host interface, and execute the one or more portions of the overlay code from the RAM.

2. The system of claim 1 wherein the host interface is an Non-Volatile Memory express (NVMe) interface.

3. The system of claim 1 wherein the one or more control circuits are configured to copy the one or more portions of the overlay code from the HMB to the overlay RAM and execute the one or more portions of the overlay code from the RAM in response to an overlay request directed to the one or more portions of the overlay code.

4. The system of claim 1 wherein the one or more control circuits further include another portion of the RAM configured as a resident RAM, the resident RAM including code for operating an overlay manager.

5. The system of claim 4 wherein the RAM is a Static Random Access Memory (SRAM).

6. The system of claim 1 wherein the host interface is a Non-Volatile Memory express (NVMe) interface and the one or more control circuits are configured to determine if a host connected to the host interface has Host Memory Buffer (HMB) capacity for storage of overlay code.

7. The system of claim 6 wherein the one or more control circuits include an overlay manager configured to transfer overlay code to the overlay RAM from the HMB for any host that has HMB capacity for storage of overlay code and to transfer overlay code to the overlay RAM from non-volatile memory for any host that does not have HMB capacity for storage of overlay code.

8. The system of claim 1 wherein the overlay RAM has a capacity to store a quantity of data equal to between 40% and 70% of the overlay code.

9. The system of claim 1 wherein the set of non-volatile memory cells is formed in a plurality of memory levels disposed above a substrate in a monolithic three-dimensional memory structure.

10. A method, comprising:
copying overlay code for a memory controller from a non-volatile memory to a Host Memory Buffer (HMB) through a host interface;
in response to an overlay request directed to a portion of the overlay code, copying the portion of the overlay code through the host interface from the HMB to a Random Access Memory (RAM) of a memory controller; and
executing the portion of the overlay code from the RAM.

11. The method of claim 10 wherein the copying the overlay code from the non-volatile memory to the HMB is performed during an initialization process and subsequent access to the overlay code is directed to the HMB and not to the non-volatile memory.

12. The method of claim 11 wherein the initialization process includes a determination whether a host provides HMB functionality to support overlay code.

13. The method of claim 12 further comprising, in response to a determination that a first host does not provide HMB functionality to support overlay code, accessing the overlay code in the non-volatile memory.

14. The method of claim 13 further comprising, in response to a determination that a second host provides HMB functionality to support overlay code, attempting to access the overlay code in the HMB of the second host and, in response to failing to access the overlay code in the HMB of the second host, accessing the overlay code in the non-volatile memory.

15. The method of claim 10 further comprising executing the portion of the overlay code from the RAM and subsequently evicting the portion of the overlay code from the RAM and copying another portion of the overlay code through the host interface from the HMB to the RAM.

16. The method of claim 10 further comprising maintaining an offset table in the HMB, the offset table providing location information regarding portions of overlay code stored in the HMB.

17. The method of claim 10 whereby the host interface is configured according to the Non-Volatile Memory express (NVMe) standard and wherein the HMB is formed of one or more portions of Dynamic Random Access Memory (DRAM) in a host that are made available to the memory controller according to the NVMe standard.

18. The method of claim 17 wherein time to transfer the portion of the overlay code from the HMB to the RAM is in a range of about 10 to 100 times less than time to transfer a copy of the portion of the overlay code through a memory interface from the non-volatile memory to the RAM.

19. An apparatus comprising:
a host interface;
a set of non-volatile memory cells;
a memory controller Random Access Memory (RAM);
means for determining if a host coupled to the host interface has Host Memory Bus (HMB) capacity for storage of overlay code, for transferring portions of overlay code from a Host Memory Buffer (HMB) through the host interface to the memory controller RAM for a host with HMB capacity, and for transferring portions of overlay code from the set of non-volatile memory cells to the memory controller RAM for a host without HMB capacity; and
means for executing portions of overlay code from the memory controller RAM.

20. The apparatus of claim 19 further comprising:
means for copying the overlay code from a non-volatile memory to the Host Memory Buffer (HMB).

* * * * *

UNITED STATES PATENT AND TRADEMARK OFFICE
CERTIFICATE OF CORRECTION

PATENT NO. : 10,558,576 B2
APPLICATION NO. : 15/876785
DATED : February 11, 2020
INVENTOR(S) : Gopalakrishnan et al.

It is certified that error appears in the above-identified patent and that said Letters Patent is hereby corrected as shown below:

On the Title Page

Item (72), Inventors: Delete "Raghavendra Das Gopalakrishnan, Bangalore (IN)" and replace with
-- Raghavendra Gopalakrishnan, Bangalore (IN) --

Signed and Sealed this
Twenty-sixth Day of May, 2020

Andrei Iancu
*Director of the United States Patent and Trademark Office*